US007677398B2

(12) United States Patent
Belfer et al.

(10) Patent No.: US 7,677,398 B2
(45) Date of Patent: Mar. 16, 2010

(54) PROCESS FOR IMPROVING MEMBRANES

(75) Inventors: Sophia Belfer, Beer Sheva (IL); Rosalia Fainstein, Beer Sheva (IL); Luba Kesselman, Beer Sheva (IL); Charles Linder, Rehovot (IL)

(73) Assignee: Ben Gurion University of the Negev Research and Development Authority, Beer Sheva (IL)

( * ) Notice: Subject to any disclaimer, the term of this patent is extended or adjusted under 35 U.S.C. 154(b) by 0 days.

(21) Appl. No.: 11/574,643

(22) PCT Filed: Sep. 4, 2005

(86) PCT No.: PCT/IL2005/000937

§ 371 (c)(1),
(2), (4) Date: Aug. 27, 2007

(87) PCT Pub. No.: WO2006/030411

PCT Pub. Date: Mar. 23, 2006

(65) Prior Publication Data

US 2008/0269417 A1 Oct. 30, 2008

(30) Foreign Application Priority Data

Sep. 19, 2004 (IL) .................................... 164122

(51) Int. Cl.
*B01D 39/00* (2006.01)
*B01D 39/14* (2006.01)
*B01D 71/28* (2006.01)
*B01D 67/00* (2006.01)
*B05D 5/00* (2006.01)

(52) U.S. Cl. ............ 210/500.38; 210/490; 210/500.35; 210/500.42; 210/500.43; 264/48; 264/49; 427/244; 427/245

(58) Field of Classification Search ............ 210/500.27, 210/500.35, 500.38, 500.42, 500.43, 490; 427/244–245; 264/48–49
See application file for complete search history.

(56) References Cited

U.S. PATENT DOCUMENTS

| 4,964,998 | A | * | 10/1990 | Cadotte et al. | ............... 210/654 |
| 5,021,160 | A | * | 6/1991 | Wolpert | ................. 210/500.35 |
| 5,039,420 | A | * | 8/1991 | Klein et al. | ................. 210/645 |
| 5,215,692 | A | | 6/1993 | Hörl et al. | |
| 5,547,575 | A | | 8/1996 | Demmer et al. | |
| 6,280,853 | B1 | * | 8/2001 | Mickols | ................... 428/474.4 |
| 7,135,167 | B2 | * | 11/2006 | Legrand et al. | ........ 424/70.122 |

OTHER PUBLICATIONS

S. Belfer, et al., "Modification of NF membrane properties by in situ redox initiated graft polymerization with hydrophilic monomers", Journal of Membrane Science, vol. 239, No. 1, XP-004516960, Aug. 1, 2004, pp. 55-64.
Viatcheslav Freger, et al., "TFC polyamide membranes modified by grafting of hydrophilic polymers: an FT-IR/AFM/TEM study", Journal of Membrande Science, vol. 209, No. 1, XP-004382361, Nov. 1, 2002, pp. 283-292.

* cited by examiner

*Primary Examiner*—Ana M Fortuna
(74) *Attorney, Agent, or Firm*—Oblon, Spivak, McClelland, Maier & Neustadt, L.L.P.

(57) ABSTRACT

The invention provides a process for improving the antifouling properties and for increasing the selectivity of commercial composite polyamide nanofiltration (NF) and reverse osmosis (RO) membranes comprising circulating a low concentration of water soluble monomers and an initiating redox couple in an aqueous solvent, without transverse pressure over the surface of the membrane thereby effecting a free-radical graft polymerization on the surface of the membrane.

14 Claims, No Drawings

PROCESS FOR IMPROVING MEMBRANES

The present invention relates to a process for improving the antifouling properties and for increasing the selectivity of commercial composite polyamide nanofiltration (NF) and reverse osmosis (RO) membranes as well as to the modification of reverse osmosis and nanofiltration membranes in general by a method that improves selectivity and fouling resistance without the reduction of flux from that of the original membranes.

Membranes are being used increasingly in industry and for water treatment. The use of such membranes for this purpose is however limited due to relatively low flux and/or selectivity. In addition, for water treatment, higher fluxes and better selectivity's for various solutes in the form of higher rejections would find many uses where water cost is important.

In the state of the art, one way to improve rejection and/or selectivity are by grafting polymers onto ultrafiltration (UF) membranes or by the modification of UF or RO membranes by graft polymerization. Such graft polymerization may be by solution graft polymerization and crosslinking with water-soluble polymers and redox initiators, or by irradiation using ionizing radiation such as in plasma polymerization, high energy electron grafting as well as processes utilizing x-rays and visible light. Usually such grafting treatment by polymerization of monomers lowers the original membrane flux and makes the use of such membranes uneconomical for water treatment.

In three articles by S. Belfer et al (S. Belfer, Y. Purinson, R. Fainchtain, Y. Radchenko, O. Kedem, J. Membr. Sci. 139 (1998) 175; S. Belfer, Y. Purinson, O. Kedem, Acta Polym. 49 (1998) 574; S. Belfer, Y. Purinson and O. Kedem, Desalination, 119 (1998) 189) the use of graft polymerization to modify pre-made RO and UF membranes to enhance their nonfouling nature are described. More particularly the third article relates to a process for improving the surface properties of commercial reverse osmosis composite membranes, wherein the treatment is based on free-radical graft polymerization. In general however the treatment results in membranes with lower flux even though the final membranes are more fouling resistant and have in some cases higher rejections. The same inventors have also applied this procedure to improving the selectivity of NF and UF membranes and the hydrophilization of UF membranes (S. Belfer, R. Fainchtain, Y. Purinson, O. Kedem, J. Membr. Sci. 172 (2000) 113 and S. Freger, J. Gilron, S. Belfer, J. Membr. Sci. 209 (1) (2002) 283) however as with the RO membranes, the modification procedure by grafting has resulted in membranes with lower fluxes.

In the above state of the art the monomers are applied as an aqueous solution of from about 10% to about 20% without flow. Such high monomer concentrations results in flux loss as compared to the present invention.

Methods to increase the hydrophilic characteristics and thus improve fouling resistance and or rejections of NF and RO membranes have been recently described in U.S. Pat. No. 6,280,853 assigned to Dow Filmtec. In said patent the surfaces of the membranes are modified by reaction of reagents containing ethylene oxide moieties with reactive groups such as amines and carboxyl groups found on the RO and/or NF membranes. In the examples of this patent the membranes not treated with the PEG reagents, e.g., PEG diepozide, have considerably higher fluxes them the treated membrane. The aforementioned treated membranes have higher rejections but with lower flux than the non-treated membranes. In the present invention there has been achieved a higher reaction without loss of flux.

Hydrophilization of membranes has received much attention in the last few years. Hydrophilization of hydrophobic surfaces combines improved separation characteristics with strength and chemical resistance. Hydrophilization of ultrafiltration and microfiltration membranes results in increased resistance to fouling. Most of the published work on surface modification is related to ultrafiltration or microfiltration membranes.

Low temperature plasma also has been used extensively for modifying the surface of ultrafiltration and microfiltration membranes. Shimomura et al. preparation of polyacrylonitrile reverse osmosis membrane by plasma treatment, J. Appl. Polym. Sci., Appli. Polym. Symp. 38 (1984) 173-183. used helium oxygen plasma to produce acrylonitrile reverse osmosis membranes. Clarotti et al. hydrophilized polysulfone membranes with plasma containing a mixture of ethylene oxide and perfluoro-hexane. [Plasma deposition of thin fluorocarbon films for increased membrane hemocompatibility, J. Membrane Sci., 61 (1991) 289-301]. Wang et al. altered polypropylene surfaces in the presence of ammonia to make them more hydrophilic [a one-side hydrophilic polypropylene membrane prepared by plasma treatment, J. Membrane Sci., 53 (1990) 275-2861. Membranes made of polyetherimide, allylamine and poly(dimethyl siloxane) also were modified using low temperature plasmas as described, e.g. by P A. Kawzkami et al. modification of gas permeabilities of polymer membranes by plasma coating, J. Membrane Sci., 19 (1984) 249-258; A. T. Bell, et al. A study of the performance and chemical characteristics of composite reverse osmosis membranes prepared by plasma polymerization of allylamine, J. Appl. Polym. Sci., 19 (1975) 1911-1930; and, K. Asfardjani, et al. Effect of plasma treatments on wettability of polysulfone and polyetherimide, J. Appl. Polym. Sci., 43 (1993) 271-281.) Sedath et al. modified polysulfone ultrafiltration membranes using fluorine gas to decrease the rate of fouling [Reduced fouling of ultrafiltration membranes via surface fluorination, Sep. Sci. Technol., 28(1/3) (1993) 255-269.] Fluorine and oxygen added to the surface seems to account for the increase in hydrophilicity and decreased fouling rate.

Recently, there has been described radical grafting of hydrophilic monomers using photochemical initiation to polysulfone [H. Yamagishi, et al. Development of a novel photochemical technique for modifying poly(arylsulfone) ultrafiltration membranes. J. Membr. Sci. 105, 237, 1995 polyacrylonitrile M. Ubbricht, et al. Gas-Phase Photoinduced Graft Photopolymerization of Acrylic Acid onto Polyacrylonitrile Ultrafiltration Membranes. J. Appl. Pol. Sci. 55, 1707, 1995 and to Polyvinylfluoride Surface modification of UF membranes has proven useful in improving the separation characteristics of these membranes and increasing their fouling resistance. However when the modification is carried out by direct plasma or by radiation initiation there may be damage to the membrane structure, comprising rejection. In addition chemical initiation by a photo initiator coated onto the membrane followed by UV-irradiation often reduces water permeability.

From the above it can be seen that many membrane modifications are targeted to the modification or improvement of porous UF and MF membranes. In another example of modification the treatment of RO membranes by Hydrofluoric Acid, following an attempt to filter Hydrofluoric Acid solutions, resulted in substantial increase of flux. The mechanism of the change is so far not clear [See, e.g., D. Mukherjee, et al. Flux enhancement of thin film composite reverse osmosis membranes by chemical surface modification, J. Membrane Sci., 97(V3) (1994) 231-249; and, D. Mukherjee, et al. Flux enhancement of reverse osmosis by surface modification, AIChE Annual Meeting, St. Louis, Mo., 1993, paper no. 47b.

From these references, a general short coming of the state of art appears to be the difficulty of carrying out a controlled chemical reaction on the surface of the thin selective polyamide layer of the commercially available TFC (thin film composite) membranes, without reducing flux or destroying rejection or selectivity. These commercial polyamide membranes are sensitive to various chemicals, especially oxidizing agents.

According to the present invention there has now been surprisingly found a method of graft polymerization, which does not lower flux and in many cases increases the flux while at the same time also increases rejection or improves selectivity. The membranes treated by this method would be more cost effective than the original membranes in water applications or industrial applications. The inventive process involves the graft polymerization of hydrophilic membrane utilizing monomers in one or more layers under flow conditions, with little or no pressure across the membrane using a low concentration of monomers, to give membranes with improved rejection and selectivity and fluxes that are the same or higher than the original membrane. The same modification on similar membranes without flow, and or at higher monomer concentration and or pressure across the membrane gives a final membranes with a significantly lower flow.

Thus, inter alia, the present invention relates to the treatment of prefabricated commercial available polyamide composite RO membranes with an aim to improve antifouling characteristics and selectivity of the membrane without loss of the original flux as well as to the modification of a composite polyamide reverse osmosis membrane.

More particularly, according to the present invention there is now provided a process for improving the antifouling properties and for increasing the selectivity of commercial composite polyamide nanofiltration (NF) and reverse osmosis (RO) membranes comprising circulating a low concentration of water soluble monomers and an initiating redox couple in an aqueous solvent, without transverse pressure over the surface of the membrane thereby effecting a free-radical graft polymerization on the surface of the membrane.

In one embodiment the methods of the present invention can be carried out in pre-made membrane elements or on flat sheets and at room temperature in aqueous media.

In another embodiment the present invention relates to the treatment of prefabricated commercial available polyamide composite RO/NF membranes with an aim to improve antifouling characteristics of the membrane.

In another embodiment of the present invention multiple layers may be added of the same or different polymers to adjust the selectivity of the final membrane without the loss of flux.

Thus a preferred embodiment of the present invention comprises grafting between 1 and 5 additional layers in sequence.

In preferred embodiments of the present invention a second graft layer is grafted onto a first grafted layer.

In said embodiments preferably the second layer comprises oppositely charged monomers to that of the first grafted layer.

In first preferred embodiments of the present invention each individual layer contains a chemical composition different than that of the remaining layers.

In other preferred embodiments of the present invention each individual layer contains a chemical composition similar to that of the remaining layers.

In especially preferred embodiments of the present invention there is provided a process as defined herein for the modification of a composite polyamide nanofiltration or reverse osmosis membrane to form polymeric chains covalently grafted to the surface thereof, comprising treating the surface of a commercial composite polyamide reverse osmosis membrane with an aqueous solution containing an oxidizing initiator, a reducing activator and an ethylenically unsaturated monomeric compound at substantially room temperature to create active sites on the polyamide layer and to form covalent graft chains between the surface of said polyamide and polymeric chains formed from said unsaturated monomeric compound wherein said polymeric chains are selected from the group consisting of polyvinyl chains containing pendant and main chain functional groups and polyacrylic chains.

In the process of the present invention the grafting reactions are preferably carried out in aqueous solutions, at temperatures in the range of about 20° C. to about 40° C. and at atmospheric pressure.

Preferably, the contact time between said water soluble monomers and said membrane surface is in the range of about 15 minutes to about 2 hours.

In especially preferred embodiments of the present invention the monomers are chosen from the group of ethylenically-unsaturated compounds and preferably said monomers are selected from the group consisting of acrylic acid, methacrylic acid, acrylonitrile, acrylamide, hydroxyethyl methacrylate, vinylsulfonic acid Na-salt, styrene sulfonic acid, vinyl-pyridine, vinyl-pyrrolidone, vinyl-imidazole, polyethylene glycol containing acrylates, glycidyl-methacrylate, hydroxypropyl methacrylate, sulfopropylmethacrylate.

In the process of the present invention free radical generating material of said initiating redox couple is preferably selected from the group consisting of the oxidant compounds ammonium persulfate, potassium persulfate, sodium persulfate, sodium perborate, and acetyl peroxide and reducing components of said redox couple are preferably selected from the group consisting of a bisulfite and ascorbic acid added to the oxygen compounds.

Preferably the amount of initiator varies from about 0.5% to about 2% of monomer weight, while the ratio of the initiator/activator is maintained in the range of about 3:1 to 1:3.

In further preferred embodiments of the present invention said aqueous solvent further comprises a lower alcohol co-solvent and preferably said lower alcohol co-solvent is selected from the group consisting of isopropanol and methanol.

One of the preferred embodiments of the present invention involves multiple grafting of different layers wherein each layer is applied under flow conditions with low concentration of monomers. Under these conditions there is no drop in flux even though multilayers are applied and the selectivities are essentially improved. The multilayer approach can also tailor membrane separation with better control than other modification processes.

It has been surprisingly found that even though multiple layers have been applied, the present process does not result in a membrane having flux lower than that of the starting membrane.

The treatment of membranes to enhance performance is described in the prior art and in a number of patents.

In the present invention the process of grafting proceeds by circulating the reaction mixture comprising an aqueous solution of monomers and initiators, along the membrane surface. This process may be carried out on different membrane configurations, such as, e.g., flat sheets in a plate and frame device, flat sheets in a spiral wound elements, on hollow fibers, individually or in bundles or in hollow fiber elements, or membrane tubes or tublets, individually or in bundles or in elements.

Contrary to the above state of the art, it is now been surprisingly discovered that it is possible to improve the surface properties of commercial composite polyamide NF or RO membranes by free-radical graft polymerization without the loss of flux from that of the original membrane. By improved surface properties it is meant that the membrane may have higher rejection or better selective separations of different ions and/or may be more resistant to fouling. Within the present invention this is achieved without flux loss from that of the original membrane.

The invented grafting procedure may be accomplished by simple circulation, with little or no transverse pressure across the membrane, of the reaction mixture comprising the initiators and monomers in water or water solvent mixtures. The choice of solvent must be such that it does not damage the membrane being modified. The invented method in one preferred embodiment does not need heat, plasma or other radiation treatments.

In another embodiment a second graft layer is grafted onto the first grafted layer. In one preferred case the second layer comprises oppositely charged monomers to that of the first grafted layer. In this approach high grafting levels may be achieved. Subsequent grafted layers may also be added and in this way multiple layers of two to ten layers may be built up.

More particularly, the present invention now provides a process for the modification of a composite polyamide NF or reverse osmosis membrane to form polymeric chains covalently grafted to the surface thereof, comprising treating the surface of a commercial composite polyamide reverse osmosis membrane with a flowing solution, under little or no transverse pressure, of an aqueous solution containing an oxidizing initiator, a reducing activator and an ethylenically unsaturated monomeric compound at substantially room temperature to create active sites on the polyamide layer and to form covalent graft chains between the surface of said polyamide and polymeric chains formed from said unsaturated monomeric compound wherein said polymeric chains are selected from the group consisting of functionalized polyvinyl chains and polyacrylic chains.

In another embodiment the monomer mixture comprises for instance methacrylic acid and 2-hydroxyethylmethacrylate (HEMA) or methacrylic acid (MA) and 2-(dimethylamino)ethylmethacrylate (2-DMAEMA).

The invention also provides a composite polyamide NF or reverse osmosis membrane having polymeric chains selected from the group consisting of functionalized polyvinyl chains and polyacrylic chains covalently grafted to the surface thereof.

As stated, it was surprising to discover, according to the present invention, that surface graft polymerization of monomers under certain conditions of flow and concentration can be carried out with redox initiating systems without loss of flux and without damaging the bulk properties of membrane. Polymers formed are covalently attached to the surface, while salt rejection and water flux remain unchanged or increased. The grafting reactions are carried out in aqueous solutions, at room temperature. The peroxides and activators create radicals on the polyamide polymer, which serve as polymerization initiators for the monomers in solution.

The present invention is the combination of graft polymerization carried out under flow with little or no transverse membrane pressure and a low monomer concentration needed to achieve a modified membrane with improved properties but without the reduction of flux. In some embodiments the flux is improved. The range of concentration of monomers in this invention are may be chosen from a range 0.03-2%, 0.3-1% (0.03-=0.1 m/l) more preferred. The flow rates of which the monomers and initiators are circulated over the surface of the membranes of this invention may be between 0.1/-2 l/min and preferably between 0.4 l/min to 1.5 l/min.

The time required for the desired properties to be imparted to the membrane will vary depending on the nature of the monomer, temperature, concentration of the reagent and other factors. Preferably, the reagent and initiator/activator system should flow continuously over the membrane surface during treatment to replenish the reaction, which occurs on the surface. Typically, contact times in the range of about 15 minutes to about 2 hours are desirable. The temperature during reaction is desirably maintained so as to avoid deleterious effects on the membrane. Generally, temperatures in the range of about 20° C. to about 40° C. preferably about 20° C. to about 30° C. are advantageous. The grafting is conveniently conducted at atmospheric pressure.

The mechanism of the present process employed in this invention is comprised of several steps: oxidation-reduction interaction between, peroxides and "activators" taking place in aqueous solution and resulted initiation and radical formation on a polyamide polymer backbone of the membrane, grafting of the monomer, dissolved in aqueous solution of initiators, onto this polymer backbone and subsequent polymerization, giving graft chains of new polymer.

The monomers that may be used alone or in combination are ethylenically unsaturated compounds, preferably selected from the group consisting of acrylic acid, methacrylic acid, acrylonitrile, acrylamide, hydroxyethyl methacrylate, vinylsulfonic acid Na-salt, styrene sulfonic acid, vinyl-pyridine, vinyl-pyrrolidone, vinyl-imidazole, polyethylene glycol containing acrylates, glycidyl-methacrylate, hydroxypropyl methacrylate, sulfopropylmethacrylate. and 2-(dimethylamino)ethylmethacrylate (2-DMAEMA) or Allylamine, 2-acrylamido-2-methyl-1propanesulfonic acid, methacryloyloxy-ethyltrimethylammonium chloride, methacryloyl, ethylene glycol methacrylate phosphate, ethylene-glycol dimethacrylate, styrene, divinylbenzene, 3-acrylamidopropyltrimethylammonium chloride, methacryloyloxyethyl-trimethylammonium chloride.

The initiator-activator systems are different free radical generating materials and are preferably selected from the group consisting of ammonium persulfate, potassium persulfate sodium persulfate, sodium perborate, acetyl peroxide and the like redox initiators. Reducing components are preferably selected from the group consisting of a bisulfite, ascorbic acid or the like and should be added to the oxygen compounds. The amount of initiator preferably varies from about 0.003 m/l 0.2 m/l of monomer weight, while the ratio initiator/activator is preferably kept in the range of about 3:1 to 1:3. The low energy of activation of these system permits to carry out the polymer formation at low temperature.

The monomer contacts the polyamide backbone of the membrane while in a liquid diluent. Preferably, this diluent does not deleteriously affect either the barrier layer or the support layer of the composite membrane. An effective amount of initiator/activator mixture in aqueous solution is employed to supply a suitable amount of active sites on the polyamide layer as well as monomer radical in the aqueous media. Co-solvent can be employed with water in the case of limited solubility of the monomer in water. Suitable co-solvents include the lower alcohols such as isopropanol or methanol. An aqueous solution of from about 0.1% to about 1% of the monomer is generally preferred.

The pH of the reagents mixture plays an active role in the initiation of the process and should be adjusted according to the monomer chosen. For example styrene sulfonic acid (SSA), Na salt gives pH=8.4 therefore pH must be adjusted to pH 1.8, for efficient polymerization by adding a few drops of $H_2SO_4$.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the resent invention only and are presented in the cause of providing what is believed to be the most useful and readily understood description of emulation procedures as well as of the principles and conceptual aspects of the invention.

EXAMPLES

Example 1

A solution of 0.5 m/l of HEMA was prepared in water and 2% of potassium Persulfate in relation to monomer weight and ⅓ of potassium metabisulfite in relation to potassium persulfate weight were added. A 2.4 by 14 inch SWC-2 membrane (produced by Hydranautics, USA) was modified in this example. The reaction mixture was circulated through the 2.5×14 inch element of this membrane with a rate of 230 ml/min for 1 hour. Then membrane was washed and tested. The flux and rejection of solution 32 g/l NaCl at 23 bar were performed. Flux 67.8 lm2h and rejection 99.1% were obtained (for original membrane F=64.8 lm2h and R=98.8%). This shows that while the modification improved rejection it did not reduce the flux.

Example 2

The same ingredients, membrane and application conditions as used in Example 1 were employed however the concentration of monomer was 0.03 m/l and concentrations of initiators were 0.03 m/l of each. Time of reaction was 1 hour. The results of this membrane are 68.2 $lm^2h$ and rejection 99.0% at the same conditions. Improving both rejection and flux over the original membrane.

Example 3

An experiment similar to Example 1 was conducted using 1 m/l solution of SPM, Na salt in water with pH=1.8 adjusted by adding a few drops of $H_2SO_4$. 0.2 m/l of potassium persulfate and 0.2 m/l of potassium metabisulfite was added as initiators. A flat commercial NF membrane NF-200 (Dow, Germany) was chosen for grafting. Membranes were mounted in a flat channel-flow cell made of Perspex with a flow cross-section 2-mm thick by 2-cm wide and a channel length of 8 cm. The reaction mixture was circulated without no pressure with a rate of 0.4 l/min. Reaction time was 60 minutes at ambient temperature. The flux and rejection towards 500 ppm $Na_2SO_4$ were at 15 bar tested and compared with non-modified membrane.

Flux of pure water was equal for modified and for non-modified membranes at approximately 98-100 l/m2/h, while rejection of sulfate was 99.5% for the modified as compared to 98.6% non-modified, showing how this procedure can improve rejection without reducing flux.

Example 4

An experiment similar to example 3 was conducted using 2DMAEMA. A solution of 1 m/l was prepared in water and concentration 0.01 m/l of potassium persulfate and 0.01 m/l potassium metabisulfite were used. The DOW-FilmTec NF-200 commercial membrane was employed and time of reaction was 30 min. The same arrangements were used for grafting process as in example 3 with a rate of circulation equal 0.4 l/m. The membranes were tested as in example 3 and showed that the modification procedure increased sulfate rejection by 10% without loss of flux.

Example 5

An experiment similar to example 4 was carried out with HEMA (0.03 m/l) as grafting monomer and concentration of initiators was 0.03 m/l of each. Time of reaction was 60 min with NF-200 membrane. After washing the membrane shows the flux of 130 lm2h and rejection of chloride (NaCl and sulfate (Na2SO4) were 70% and 99% respectively (instead of a flux of non-modified membrane which was 120 l/m2/h and 55% and 81% to NaCl and Na2SO4 for non-modified membrane.

Example 6

An experiment similar to example 4 was conducted using two monomers sequentially. First, a solution of 0.1 m/l 2DMAEMA was prepared in water and two components of the redox initiators in concentration 0.01 m/l of each were added. The solution was flowed over membrane for 10 min in a cross-flow cell as in example 3. The membrane was washed and another solution comprising 0.5 m/l of SSA, Na salt adjusted to pH=1.8 and containing 0.01 m/l of both initiators was circulated during 1 hour. The flux of modified membrane was 120 lm2h and sulfate rejection was 99.6% (flux non-modified membrane was 104 lm2h). They were checked as in example three.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A process for improving the antifouling properties and for increasing the selectivity of commercial composite polyamide nanofiltration (NF) and Reverse osmosis (RO) membranes comprising circulating a low concentration of a water soluble monomers and an initiating redox couple in an aqueous solvent, without transverse pressure over the surface of the membrane, thereby effecting free-radical graft polymerization on the surface of the membrane to form a first grafted layer and grafting between 2 and 5 layers in sequence onto said first grafted layer; wherein the resulting membrane has an increased flux.

2. The process according to claim 1, wherein a second grafted layer is formed and wherein said second layer comprises oppositely charged monomers to that of said first grafted layer.

3. The process according to claim 1, wherein said between 2 and 5 layers in sequence each contain a chemical composition different from that of another of said between 2 and 5 layers.

4. The process according to claim 1, wherein said between 2 and 5 layers in sequence each contain a chemical composition similar to that of another of said between 2 and 5 layers.

5. A process according to claim 1 for the modification of a composite polyamide nanofiltration or reverse osmosis membrane to form polymeric chains covalently grafted to the surface thereof, comprising treating the surface of a commercial composite polyamide reverse osmosis membrane with an aqueous solution containing an oxidizing initiator, a reducing activator and an ethylenically unsaturated monomeric compound at substantially room temperature to create active sites on the polyamide layer and to form covalent graft chains between the surface of said polyamide and polymeric chains formed from said unsaturated monomeric compound wherein said polymeric chains are selected from the group consisting of polyvinyl chains containing pendant and main chain functional groups and polyacrylic chains.

6. A process according to claim 1 wherein the grafting reactions are carried out in aqueous solutions, at temperatures in the range of 20° C. to 40° C. and at atmospheric pressure.

7. A process according to claim 1 wherein the contact time between said water soluble monomers and said membrane surface is in the range of about 15 minutes to about 2 hours.

8. A process according to claim 1 wherein the monomers are chosen from the group of ethylenically-unsaturated compounds.

9. A process according to claim 8 wherein said monomers are selected from the group consisting of acrylic acid, methacrylic acid, acrylonitrile, acrylamide, hydroxyethyl methacrylate, vinylsulfonic acid Na-salt, styrene sulfonic acid, vinyl-pyridine, vinyl-pyrrolidone, vinyl-imidazole, polyethylene glycol containing acrylates, glycidyl-methacrylate, hydroxypropyl methacrylate, sulfopropylmethacrylate.

10. A process according to claim 1 wherein free radical generating material of said initiating redox couple is selected from the group consisting of the oxidant compounds ammonium persulfate, potassium persulfate, sodium persulfate, sodium perborate, and acetyl peroxide and reducing components of said redox couple are selected from the group consisting of a bisulfite and ascorbic acid added to the oxygen compounds.

11. A process according to claim 1 wherein the amount of initiator varies from about 0.5% to about 2% of monomer weight, while the ratio of the initiator/activator is maintained in the range of about 3:1 to 1:3.

12. A process according claim 1 wherein said aqueous solvent further comprises a lower alcohol co-solvent.

13. A process according to claim 12 wherein said lower alcohol co-solvent is selected from the group consisting of isopropanol and methanol.

14. The process according to claim 1, wherein said process involves sequential grafting of oppositely charged monomers onto the surface of the membrane.

\* \* \* \* \*